US005384679A

United States Patent [19]

Smith

[11] Patent Number: 5,384,679

[45] Date of Patent: Jan. 24, 1995

[54] SOLID STATE SURGE PROTECTORS

[75] Inventor: Thomas J. Smith, Bay Shore, N.Y.

[73] Assignee: TII Industries, Inc., Copiague, N.Y.

[21] Appl. No.: 153,092

[22] Filed: Nov. 17, 1993

[51] Int. Cl.$^{6}$ ..... H02H 3/22

[52] U.S. Cl. ..... 361/119; 361/111; 361/56

[58] Field of Search ..... 361/54, 56, 104, 111, 361/119; 337/31, 34

[56] References Cited

U.S. PATENT DOCUMENTS 4,212,047 7/1980 Napiorkowski ..... 361/119
4,533,971 8/1985 Smith ..... 361/119
4,642,723 2/1987 Achtnig et al. ..... 361/119
5,224,012 6/1993 Smith ..... 361/119

*Primary Examiner*—Marc S. Hoff
*Assistant Examiner*—Sally Medley
*Attorney, Agent, or Firm*—Martin Sachs

[57] ABSTRACT

The present invention relates to solid state surge protectors, having thermally sensitive fusible fail short protection associated therewith, enclosed in a hollow housing which provides three terminals and is specifically designed to be the same volume as gas tube surge arresters presently in use so that it may readily be replaced in any assembly which utilizes a gas tube arrester at the present time.

9 Claims, 3 Drawing Sheets

SOLID STATE SURGE PROTECTORS

BACKGROUND OF THE INVENTION

1. Field of the Invention

The present invention relates to overvoltage surge arresters having thermally sensitive fusible fail short protection associated therewith, and more particularly, a solid state surge protector with a thermally sensitive fusible fail short protection enclosed in an assembly, which is the same in size as a three terminal gas tube arrestor and may readily replace same.

2. Background of the Invention

Although thermally sensitive fusible fail short protection has been associated with overvoltage gas tube protectors for a long time and are well known in the art. They are presently used extensively for telephone communication systems and have been steadily included with solid state devices, which are more reliable. The size of the solid state device has not been critical and they have been, generally speaking, larger in size than the gas tube arresters. At the present time, there appears to be a concentrated effort to reduce the size of all types of electronic equipment. Therefore, the solid state overvoltage surge protector, being in wide use, became the subject of a concentrated effort to reduce its size. Many attempts have been made to provide a package, which may readily replace the gas tube arrestor with its associated thermally sensitive fusible fail short protection in a miniature assembly, which may be directly inserted in the same mounting that was used for the gas tube arrestor.

One assembly, which attempts to utilize a miniaturized solid state overvoltage protection device is disclosed in U.S. Pat. No. 5,224,012, issued to Thomas J. Smith on Jun. 29, 1993. Disclosed therein is a miniature solid state surge protector apparatus for use on telephone central offices or the like, which does not include a thermally sensitive fusible fail short protection associated therewith. This configuration is not suitable for direct replacement of the present gas filled overvoltage surge arrestor. Therefore, it is an object of the present invention to provide a miniaturized solid state overvoltage protection device having thermally sensitive fusible surge protection associated therewith in an assembly which is readily substituted for a present gas tube overvoltage protection device.

It is another object of the present invention to provide a overvoltage protection device having three terminals, which is a direct replacement for a three terminal gas tube overvoltage protection device.

It is yet another object of the present invention to provide a solid state overvoltage protection device including thermally sensitive fusible surge arresters which are disposed in a three terminal device readily mountable and easily replaceable in the same volume as the present gas filled surge arrestor.

SUMMARY OF THE INVENTION

A solid state surge protector with thermally sensitive fusible fail short protection for use on telephone communication systems according to the present invention, comprises in combination an elongated hollow housing member open at one end and closed at the other and having a longitudinal axis and transverse axis. The housing member is provided with three through apertures, two of the apertures are disposed proximate to the distal ends of the housing member. The third of the three apertures is centrally disposed between the two apertures. The three through apertures provide access to the terminals of the solid state surge protector arrangement. A fourth through aperture is disposed in line with and on the opposite surface of the housing member at the end of the transverse axis. The fourth aperture is adapted to receive a portion of a mounting apparatus therein. A pair of elongated through channels are disposed on the distal edges of the housing member. A plurality of components are placed within the hollow housing member and include the following: a first thermally sensitive fusible device disposed at the closed end of the housing, a first conducting device in contact with the first breakdown device placed over one of the three through apertures, via the closed housing member end. A first solid state overvoltage protection device has two terminals, one of the terminals is placed in contact with the first conducting device, the second conducting device is in contact with the other terminal of the first solid state overvoltage protection device. The second conducting device is placed over the centrally disposed second housing member through aperture. The second overvoltage protection device has two terminals with one of the terminals in contact with the second conducting device and a third conducting device is in contact with the other terminal and the second solid state overvoltage protection device. The third conducting device is disposed over the third housing member through aperture and the second thermally sensitive fusible device is disposed at the open end of the housing member. An elongated clip has a centrally disposed inwardly extending dimple and a pair of arms at the distal ends thereof. The arms are adapted to be received into the elongated channels of the housing member and exercise an inwardly directed pressure against the first and second thermally sensitive fusible devices.

The foregoing and other objects and advantages will appear from the description to follow. In the description reference is made to the accompanying drawing, which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
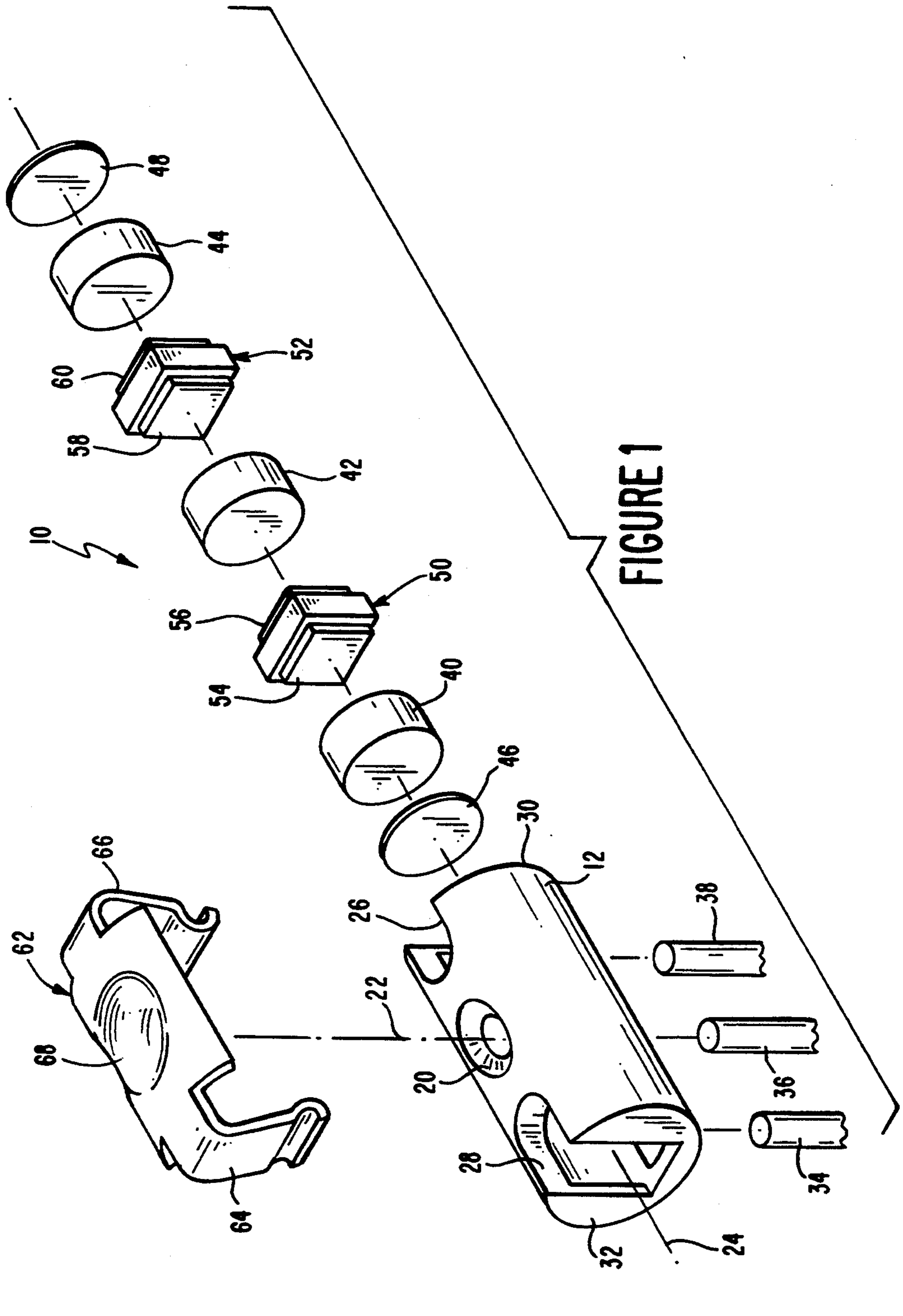
FIG. 1, is an exploded perspective view of the components utilized to provide an overvoltage protection device with a thermally sensitive fusible fail safe mechanism, according to the principles of the present invention.
Figure 2:
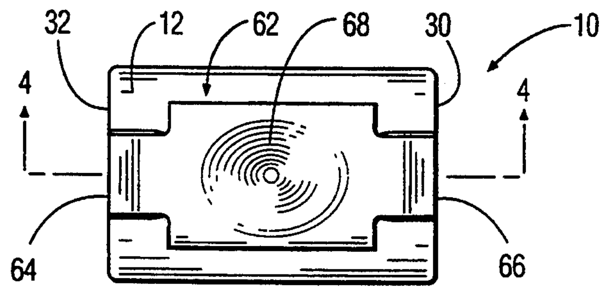
FIG. 2 is a top plan view of the overvoltage surge protector with the fail safe device included therein.
Figure 3:
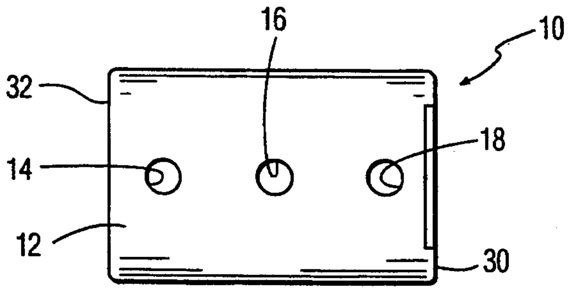
FIG. 3 is a bottom plan view of the apparatus shown in FIG. 2.
Figure 4:
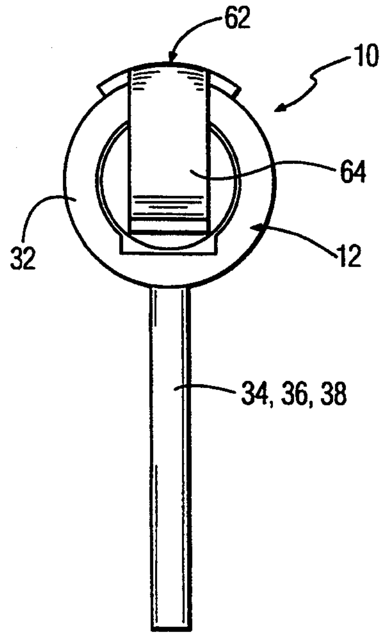
FIG. 4 is an end view in elevation of the device shown in FIG. 1 completely assembled.

Referring now the figures, and in particular to FIGS. 1, 2, 3 and 4, there is shown an overvoltage protection device 10 generally referred to as a surge protector with thermally sensitive fusible fail short protection, according to the principles of the present invention, which when completely assembled is the same size as a gas filled tube arrestor, not shown. Moreover, the assembled device includes a thermally sensitive fusible fail short protection mechanism as will be explained hereinafter. The apparatus includes an elongated, insulated, hollow housing member 12 is provided with three through apertures 14, 16 and 18 as shown in FIG. 3. In addition to a centrally disposed aperture 20 on the opposite surface of the housing member 12 along a transverse axis 22, which is perpendicular to the longitudinal axis 24 of the housing member 12. The through apertures 14, 16 and 18 preferably are in a straight line parallel to the longitudinal axis 24. The housing member 12 is also provided with a pair of through channels 26 and 28 at the distal ends of the housing member 12. Through channel 26 is formed in the housing member 12 at the open end 30 of the housing member 12 whereas through channel 28 is formed at the closed end of the housing member 12, the reason for this will be explained hereinafter. The through channels 26 and 28 are formed perpendicular to the longitudinal axis and form a straight line with regard to aperture 20 which is parallel to the longitudinal axis 24.

Terminal lead members 34, 36 and 38 are adapted to be fed through the through apertures 14, 16 and 18 and make contact with and are welded to metallic electrically conducting disks. A pair of thermally sensitive fusible disks 46 and 48 disposed at both ends of the overvoltage protection device 10 are fabricated of an insulating material having a thickness of approximately 0.2 of a mil and is known by the trade name FEP.

A pair of solid state overvoltage protection devices 50 and 52 are disposed between conducting disks 40 and 42 and 42 and 44, respectively. Each of the overvoltage protection devices 50 and 52 are provided with a pair of terminals 54 and 56, and terminals 58 and 60, respectively.

The overvoltage protection device 10 also includes a clip 62, which is electrically conductive and at the distal ends thereof is provided with arms 64 and 66, which are bent in an inwardly direction to provide pressure against the end thermally sensitive fusible disks 46 and 48 when assembled. A inwardly protruding dimple 68 is adapted to be received into the aperture 20 provided in the housing member 12 and is used to hold the assembly together and is suitable for providing a ground connection and extends into the aperture 20 making contact with the conducting disk 42.

Figure 5:
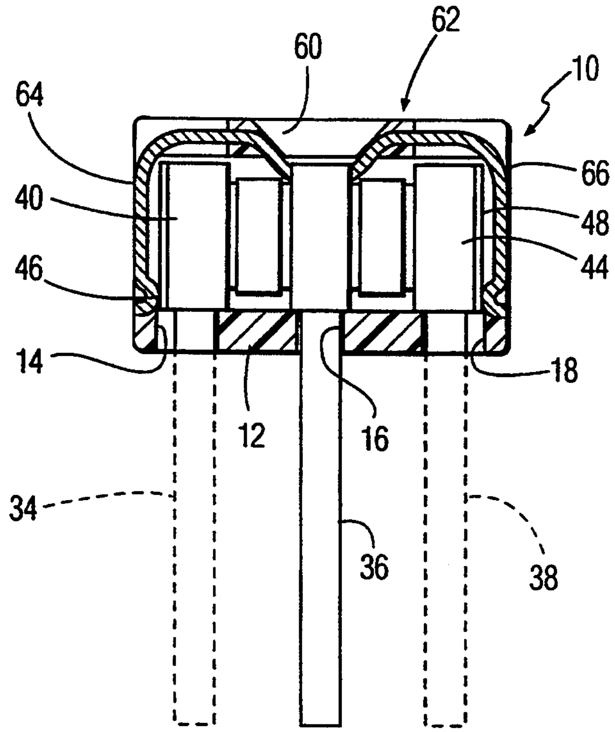
FIG. 5 is a cross-sectional view taken along the line 4—4 shown in FIG. 2.

Referring now to FIG. 5, there is a cross-sectional view of the overvoltage protection device 10 with the thermally sensitive fusible breakdown protection, which may have either a single terminal lead 36 or alternatively may be provided with terminal lead members 34 and 38.

Figure 6:
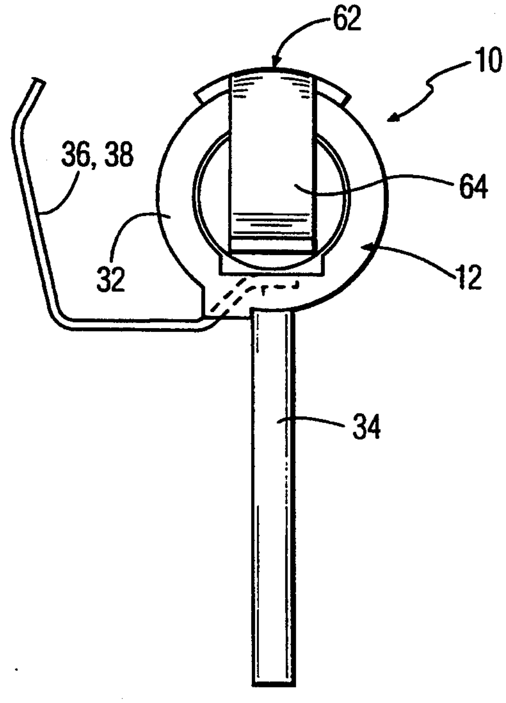
FIG. 6 is an end view in elevation of the device shown in FIG. 4 with the terminal leads extending angularly from the overvoltage protection device housing.

In FIG. 6 there is shown an end view wherein the terminal lead members 34 and 38 are bent to extend outwardly for the housing member 12 thereby providing a desired shape for installation in a particular embodiment, which may be required.

In operation, the thermally sensitive fusible disk 46 would be inserted into the hollowing portion of the housing member 12 first thereafter the metallic electrically conductive disk 40 would be placed in the hollow housing followed by the overvoltage protection device, which preferably is made by Texas Instruments, Inc., Part Number 6EL5, then the conducting disk 42 is inserted into the hollow housing followed by the overvoltage protection device 52, conducting disk 44 and lastly, thermally sensitive fusible disk When all the components are completely within the hollow housing the clip member 62 is placed over the housing and slipped into the through channels 26. The arms 64 and 66 of clip member 62 is slipped into channels 26 and 28, respectively, exerting an inward pressure on the disks 46 and 48, thereby maintaining the components within the hollow housing. The inwardly protruding dimple 68 extends into the aperture 20 is fastened to disk 42 and therefore makes electrically conductive contact with the conducting disk 42, thereby providing a place for connection to the system ground, not shown. Thereafter the terminal lead members 34, 36 and 38 are welded onto conducting disks 40, 42 and 44, via through apertures 14, 16 and 18 provided at the end design of the housing member 12. The terminal leads may either be included or not included as desired and the leads may be bent in any particular shape that is needed at the time of installation. The size of the assembly is essentially the same as that of the gas filled overvoltage tube, not shown, and may be inserted into the same assembly that the tube was used and has incorporated therein the thermally sensitive fusible surge protector devices. If the overvoltage protection devices 50 and 52 sustain continuous surge currents for any reason the thermally sensitive fusible devices 46 and 48 melt and shorts the terminals 34 and 38 to ground, via the arms 64 and 66 of the clip member 62, thereby protecting the circuitry connected to the terminals.

Hereinbefore has been disclosed a solid state surge protector with thermally sensitive fusible fail short protection suitable for use on telephone communication systems. It will be understood that various changes the details, materials, arrangement of parts and operating conditions which have been herein described and illustrated in order to explain the nature of the invention may be made by those skilled in the art within the principles and scope of the present invention.

Having thus set forth the nature of the invention, what is claimed is:

1. A solid state surge protector with back-up fail short protection for use on telephone communication systems comprises, in combination:

A. an elongated, insulated hollow housing member open at one and closed at the other end having a longitudinal axis and a transverse axis, said housing member being provided with;

a) three through apertures, two of said apertures being disposed proximate the distal ends of said housing member, the third of said three apertures being centrally disposed between said two apertures, said three through apertures providing access to the terminals of said solid state surge protector, b) a fourth through aperture disposed in line with and on the opposite surface of said housing member at the end of said transverse axis, said fourth aperture being adapted to receive a portion of a clip means therein, and c) a pair of elongated through channels disposed on the distal edges of said housing member; and B. a plurality of components being disposed within said hollow housing member, said plurality of components including;

a) first thermally sensitive fusible means disposed at the closed end of said housing, b) first conducting means in contact with said first thermally sensitive fusible means disposed over one of said three through apertures proximate said closed housing member end, c) first solid state overvoltage protection means having two terminals, one of said terminals being in contact with said first conducting means, d) second conducting means in contact with the other terminal of said first solid state overvoltage protection means, said second conducting means being disposed over said centrally disposed second housing member through aperture, e) second solid state overvoltage protection means having two terminals, one of said terminals being in contact with said second conducting means, f) third conducting means in contact with the other terminal of said second solid state overvoltage protection means, said third conducting means being disposed over said third housing member through aperture, g) second thermally sensitive fusible means disposed at the open end of said housing member, and C. elongated clip means having;

a) a centrally disposed inwardly extending dimple, and b) a pair of arms disposed at the distal ends thereof, the clip arms being adapted to be received by the elongated channels of said housing member providing an inward pressure against said first and said second thermally sensitive fusible means.

2. A solid state surge protector with back-up fail short protection for use on telephone communication systems according to claim 1, wherein said housing member is cylindrically shaped.

3. A solid state surge protector with back-up fail short protection for use on telephone communication systems according to claim 1, wherein said housing member further includes at least one terminal lead member affixed on said second conducting means and extending outwardly from said centrally disposed through aperture.

4. A solid state surge protector with back-up fail short protection for use on telephone communication systems according to claim 1, wherein said clip means includes a centrally disposed inwardly extending protrusion.

5. A solid state surge protector with back-up fail short protection for use on telephone communication systems according to claim 3, wherein said housing member further includes two terminal lead members affixed on said first and third conducting means extending outwardly and upwardly from said housing distal end through apertures.

6. A solid state surge protector with back-up fail short protection for use on telephone communication systems comprises, in combination:

A. an elongated hollow housing member open at one and closed at the other end having a longitudinal axis and a transverse axis, said housing member being provided with;

a) three through apertures, two of said apertures being disposed proximate the distal ends of said housing member, the third of said three apertures being centrally disposed between said two apertures, said three through apertures forming a straight line and providing access to the terminals of a solid state overvoltage protection means, b) a fourth through aperture disposed in line with and on the opposite surface of said housing member at the end of said transverse axis, said fourth through aperture being threaded and adapted to receive a mounting means therein, and c) a pair of elongated through channels disposed on the distal edges of said housing member; and B. a plurality of components being disposed within said hollow housing member, said plurality of components including;

a) a first thermally sensitive fusible means disposed at the closed end of said housing, b) a first conducting means in contact with a first solid state overvoltage protection means disposed over the first of said three through apertures proximate said closed housing member end, c) first solid state overvoltage protection means having two terminals, one of said terminals being in contact with said first conducting means, d) a second conducting means in contact with the other terminal of said first solid state overvoltage protection means, said second conducting means being disposed over said centrally disposed second housing member through aperture, e) a second solid state overvoltage protection means having two terminals, one of said terminals being in contact with said second conducting means, f) a third conducting means in contact with the other terminal of said second solid state overvoltage protection means, said third conducting means being disposed over said third housing member through aperture and, g) a second thermally sensitive fusible means disposed at the open end of said housing member, C. an elongated clip means having;

a) a centrally disposed inwardly extending protrusion, and b) a pair of arms disposed at the distal ends thereof, said clip arms being adapted to be received by elongated through apertures provided in said housing member providing an inward pressure against said first and said second thermally sensitive fusible means, and D. first, second and third terminal lead members, said first and third terminal lead members being affixed on said first and third conducting means extending outwardly and upwardly from said housing distal end through apertures, said second terminal lead member being affixed on said second conducting means and extends outwardly from said centrally disposed through aperture parallel to said housing member transverse axis.

7. A solid state surge protector with back-up fail short protection for use on telephone communication systems comprises, in combination:

A. an elongated hollow housing member open at one and closed at the other end having a longitudinal axis and a transverse axis, said housing member being provided with;

a) a plurality of through apertures, two of said apertures being disposed proximate the distal ends of said housing member, the third of said plurality of through apertures being between said two apertures, said plurality of through apertures providing access to the terminals of a solid state overvoltage protection, b) a fourth through aperture disposed in line with and on the opposite surface of said housing member at the end of said transverse axis, said fourth aperture being adapted to receive a clip means therein, and c) a pair of elongated through channels disposed on the distal edges of said housing member; and B. a plurality of components being disposed within said hollow housing member, said plurality of components including;

a) first thermally sensitive fusible means disposed at the closed end of said housing, b) first conducting means in contact with a first solid state overvoltage protection means disposed over one of said plurality of through apertures proximate said closed housing member end, c) a pair of solid state overvoltage protection devices, the first of said pair of solid state overvoltage protection devices having two terminals, one of said terminals being in contact with said first conducting means, d) second conducting means in contact with the other terminal of said first solid state overvoltage protection device, said second conducting means being disposed over said centrally disposed second housing member through aperture, e) the second solid state overvoltage protection device having two terminals, one of said terminals being in contact with said second conducting means, f) third conducting means in contact with the other terminal of said second solid state overvoltage protection device, said third conducting means being disposed over said third housing member through aperture, g) second thermally sensitive fusible means disposed at the open end of said housing member; and C. elongated clip means having;

a) a centrally disposed inwardly extending dimple, and b) a pair of arms disposed at the distal ends thereof, said arms clip being adapted to be received by the elongated channels of said housing member exercising an inward pressure against said first and said second thermally sensitive fusible means; and D. first, second and third terminal lead members, said first and third terminal lead members being affixed on said first and third conducting means extending outwardly and upwardly from said housing distal end through apertures, said second terminal lead member being affixed on said second conducting means and extends outwardly from said centrally disposed through aperture parallel to said housing member transverse axis.

8. A solid state surge protector with back-up fail short protection for use on telephone communication systems comprises, in combination:

A. an insulated, elongated hollow housing member, said housing member being provided with;

a) a plurality of through apertures,

B. a plurality of components being disposed within said hollow housing member, said plurality of components including;

a) a pair of thermally sensitive fusible devices, three conducting means, a pair of solid state overvoltage protection devices, each having two terminals, said components being arranged in a serial path from one end of said housing to the other end of said housing with one of said thermally sensitive fusible devices being disposed at each end of said housing, one of said conducting means extending inwardly towards the center of said housing followed by one of said pair of solid state overvoltage protection devices, terminating in the third of said three conducting means, C. elongated clip means having;

a) a centrally disposed inwardly extending dimple, adapted to be received into one centrally disposed through aperture of said housing and b) a pair of arms disposed at the distal ends of said clip means, said arms of said clip means being adapted to be received by elongated channels provided at the ends of said housing member providing an inward pressure against said first and said second thermally sensitive fusible means; and D. first, second and third terminal lead members, said first and third terminal lead members being affixed on said first and third conducting means extending outwardly from said housing through apertures proximate the distal ends of said housing, said second terminal lead member being affixed on said second conducting means extending outwardly from a centrally disposed through aperture of said housing member.

9. A solid state surge protector with back-up fail short protection for use on telephone communication systems according to claim 8, wherein said housing member is cylindrically shaped.

* * * * *